Sept. 6, 1966 C. M. ALSYS 3,271,168

HUMIDIFICATION OF SHIRRED ARTIFICIAL SAUSAGE CASINGS

Filed Nov. 15, 1965 3 Sheets-Sheet 1

CLARENCE M. ALSYS
INVENTOR.

BY Neal J. Mosely
his Attorney

HUMIDIFICATION OF SHIRRED ARTIFICIAL SAUSAGE CASINGS
Filed Nov. 15, 1965 3 Sheets-Sheet 2
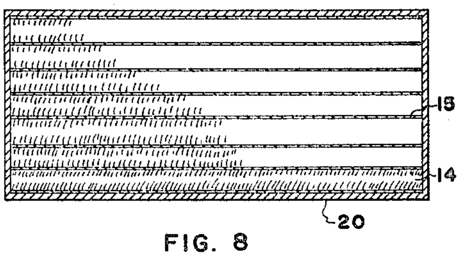
FIG. 8
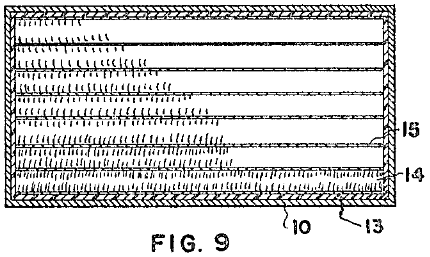
FIG. 9
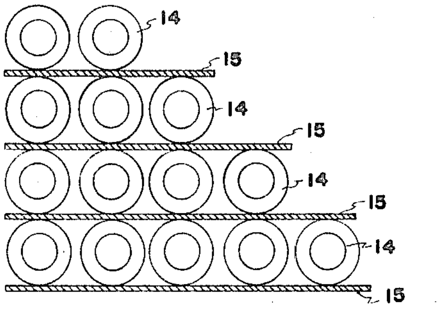
FIG. 11
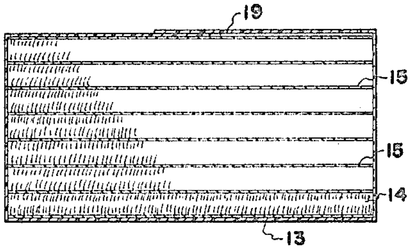
FIG. 10
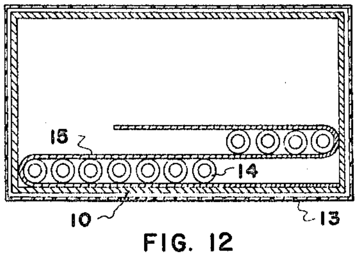
FIG. 12
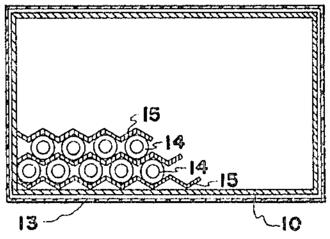
FIG. 13
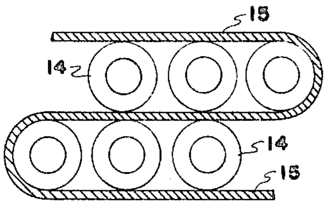
FIG. 12-A
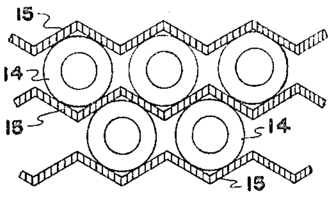
FIG. 13-A
CLARENCE M. ALSYS
INVENTOR.
BY Neil J. Mozely
his Attorney HUMIDIFICATION OF SHIRRED ARTIFICIAL SAUSAGE CASINGS
Filed Nov. 15, 1965 3 Sheets-Sheet 3
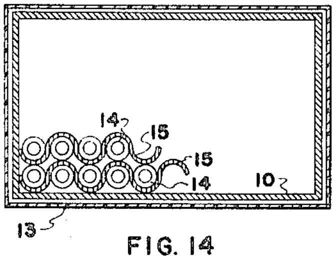
FIG. 14
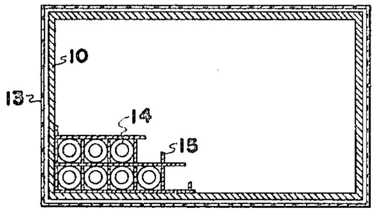
FIG. 15
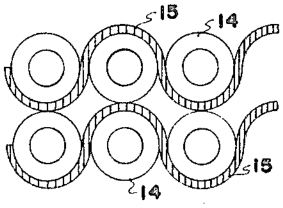
FIG. 14-A
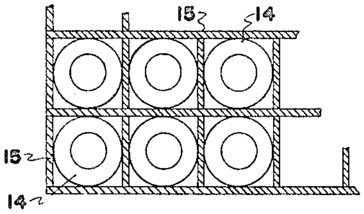
FIG. 15-A
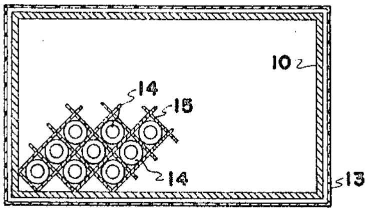
FIG. 16
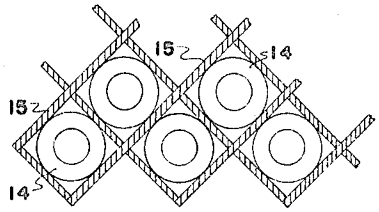
FIG. 16-A
CLARENCE M. ALSYS
*INVENTOR.*
BY Neal J. Mozely
his Attorney 3,271,168
HUMIDIFICATION OF SHIRRED ARTIFICIAL SAUSAGE CASINGS

Clarence M. Alsys, 203 Denvale Drive, Danville, Ill.

Filed Nov. 15, 1965, Ser. No. 507,751
17 Claims. (Cl. 99—176)

Figure 1:
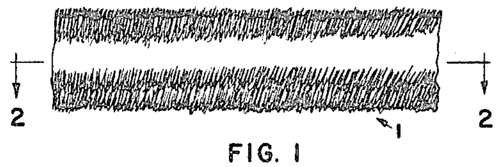

This application is a continuation-in-part of my co-pending patent application Serial No. 281,101 filed May 17, 1963, now abandoned.

This invention relates to new and useful improvements in the packaging of shirred artificial sausage casings and, more particularly, to the packaging and simultaneous humidification of such casings.

Artificial sausage casings, particularly casings formed of regenerated cellulose, are prepared as hollow, thin walled tubes of very great length. For convenience in handling, these casings are shirred from lengths ranging from 40 to 160 ft. or more down to a shirred and compressed length of the order of a few inches. An early type shirring machine and the resulting shirred product are shown in Dietrich U.S. Patent 2,010,626. Improved forms of shirring machines and the products are shown in Korsgaard U.S. Patent 2,583,654, Blizzard et al. U.S. Patents 2,722,714, 2,722,715, and 2,723,201, and Matecki U.S. Patents 2,983,949 and 2,984,574.

In the preparation and use of artificial sausage casings, particularly casings formed from regenerated cellulose, the moisture content of the casings is of extreme importance. When the casings are first formed, it is necessary that they be dried to a relatively low water content, e.g. 8 to 10%. A lower water content in the casing generally results in damage to the casing during the shirring operation. Likewise, a higher water content results in damage to the casing during shirring, usually resulting from the casing's sticking to the shirring mandrel.

After casing is shirred, it is packaged and shipped to meat packing houses where the individual shirred strands are placed on a stuffing horn and a meat emulsion extruded to fill the casing to its fully extended length. The stuffing of the casing usually takes place within a few seconds with the result that the casing is extended from a shirred length of 8 to 27 in. to an extended length of 40 to 160 ft. or more in a matter of 3 to 12 sec. This rapid extension of the casing during stuffing requires that the casing be especially strong and resistant to tearing. If even minor holes develop in the casing, the casing may split or break during stuffing and waste a large quantity of meat. In the shirring of artificial sausage casings, the pleats which are formed are sometimes interlocked and are almost always nested in strand of casing for shipment and handling. The tightly compressed and sometimes interlocked pleats require a higher moisture content to permit extension of the casing during the stuffing operation without tearing or breaking the casing. In general, an average moisture content of 15 to 20% is required, preferably about 16 to 18%. If the shirred casing has a moisture content less than about 14%, there is a tendency toward excessive breakage during stuffing. Likewise, if the casing has a moisture content in excess of about 20%, the casing is too plastic and may tend to overstuff. It is, therefore, essential that shirred casing be humidified to a relatively narrow, critical moisture content to permit stuffing without excessive breakage.

In the past, shirred artificial sausage casings have been packaged in cartons or containers which are apertured at opposite ends to permit circulation of moist air through the shirred casing strand to produce the desired moisture content in the casing.

When shirring machines of the type shown in the

Dietrich U.S. Patent 2,010,626 were in use, the shirred casings which were produced were accordion pleated but did not have nested concave pleats which were tightly compacted to provide shirred strands which were self-supporting. As a result, the shirred casing strands had to be packaged in small individual packages which were easily removed from the strand at the packing house after insertion over a stuffing horn. These individual cartons were apertured on both ends, and the packaged casings were humidified by passing moist air through and over the casing strands. At a later date, a package was developed for shirred casings, as shown in Hewitt U.S. Patent 2,181,329, which had a plurality of apertures at opposite ends and which would contain a large number of shirred casings. The Hewitt package was designed to permit the packaging of a number of shirred casing strands while providing for circulation of moist air through and around the strands to bring the moisture content to the level required for satisfactory stuffing. An improvement on the shirred casing carton of Hewitt is described and claimed in Firth U.S. Patent 2,794,544. The Hewitt and Firth packages, however, are both subject to substantial objections in commercial use. These packages are expensive to make because of the spaced perforations required in the ends of the cartons and suffer from severe mechanical weakness in the perforated end walls which results in breakage of the end walls from time to time.

The development of improved shirring machines of the type shown in the Korsgaard and Blizzard et al. patents made possible the shirring of greater lengths of casing than had been previously possible. The Blizzard et al. shirring machine produced a shirred casing having accordion pleats which were nested tightly in a concave manner with the result that the shirred and compressed casing could be held without external support. As the casing industry has tended to produce longer and longer shirred strands, e.g. today strands up to 160 ft. are shirred, the problem of humidifying casing to the critical moisture content has become increasingly difficult. In longer lengths of shirring casing, there is a considerable resistance to flow of moist air through the casing with the result that the ends of the casing tend to be more moist and the center of the casing less moist.

Accordingly, it is one object of this invention to provide a new and improved method for humidifying or moistening shirred artifical sausage casings.

Another object of this invention is to provide a new and improved method of humidifying or of moistening shirred artificial sausage casings which permits the packaging of the casing in an unperforated carton.

Another object of this invention is to provide a new and improved package comprising an unperforated carton containing a plurality of shirred artificial sausage casings and means to humidify the enclosed casings to the predetermined critical moisture content required for stuffing the casing at a meat packing plant.

A feature of this invention is the provision of a method of humidifying shirred artificial sausage casing by packaging the shirred casing hermetically in contact with absorbent material containing a predetermined amount of water sufficient to humidify the casings to the predetermined critical moisture content and storing the packaged casings for a time sufficient to allow the casings and absorbent material to reach an equilibrium water content.

Another feature of this invention is the provision of an improved package comprising an unperforated carton containing a plurality of shirred artificial sausage casings and a moisture absorbent material disposed throughout the carton in contact with substantially all of the casings and containing sufficient moisture initially to humidify the casings to a predetermined critical moisture content.

Other objects and features of this invention will become apparent from time to time throughout the specification and claims as hereinafter related.

Figure 2:
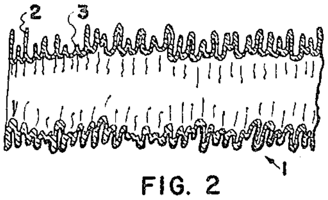
Figure 3:
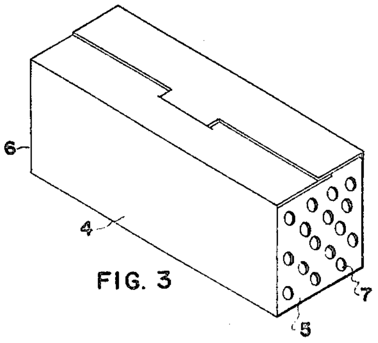
Figures 4, 5:
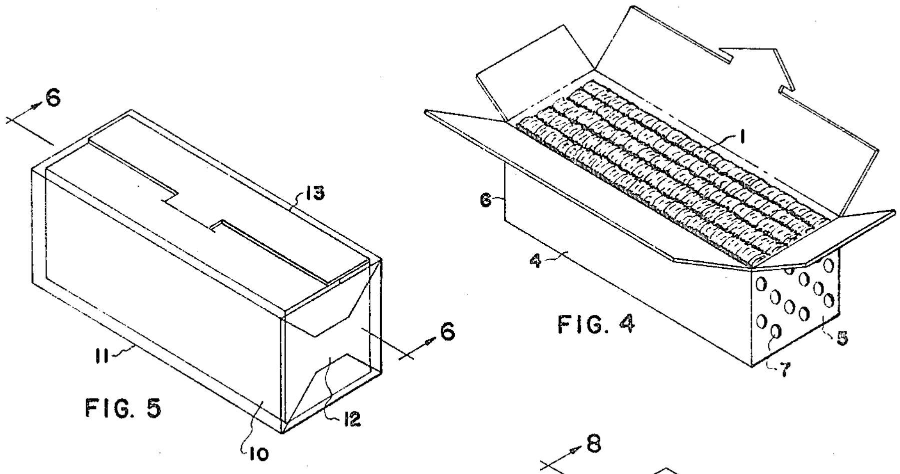
Figure 6:
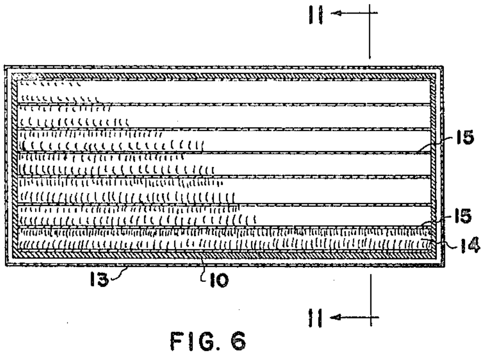

In the accompanying drawings, to be taken as a part of this specification, there are clearly and fully illustrated several preferred embodiments of this invention in which drawings, FIG. 1 is a view in elevation of a shirred strand of artificial sausage casing, FIG. 2 is a detail sectional view of the shirred casing taken on the line 2—2 of FIG. 1, FIG. 3 is a view in perspective of a carton of the type shown in the prior art for packaging shirred casings, FIG. 4 is a perspective view of the prior art carton shown in FIG. 3 with the top opened and showing the shirred casings in place, FIG. 5 is a view in perspective of a carton packaged in accordance with this invention, FIG. 6 is a sectional view taken longitudinally through the package shown in FIG. 5.

Figure 7:
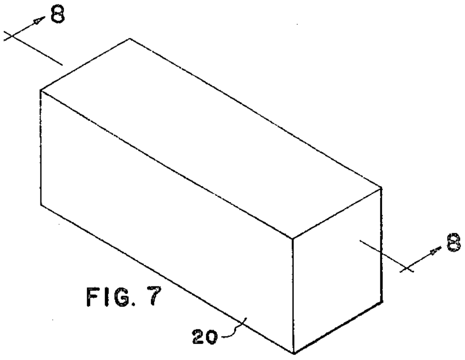

FIG. 7 is a view in perspective of a water-proof carton packaged in accordance with this invention, FIG. 8 is a view similar to FIG. 6, taken on the line 8—8 of FIG. 7, FIG. 9 is a sectional view similar to FIG. 8 showing an embodiment of the invention in which shirred casings are packaged in a water-proof liner within a carton in association with humidifying or moistening material, FIG. 10 is a sectional view similar to FIGS. 8 and 9 showing another form of the invention in which shirred casings are packaged in association with a moistening material in a flexible plastic bag or container, FIG. 11 is a sectional view taken on the line 11—11 of FIG. 6, FIG. 12 is a view similar to FIG. 6, of an alternate embodiment of the invention showing a different configuration for the moisture absorbent material within the package, FIG. 12*a* is a detail sectional view similar to FIG. 11 showing the relationship of the shirred casing strands and absorbent material in FIG. 12, FIG. 13 is a sectional view similar to FIG. 12 showing still another embodiment of the moisture absorbent material within the package, FIG. 13*a* is a detail sectional view similar to FIG. 11 showing the relationship of the shirred casing strands and absorbent material in FIG. 13, FIG. 14 is a sectional view similar to FIG. 12 showing still another embodiment of the moisture absorbent material within the package, FIG. 14*a* is a detail sectional view showing the relationship of the shirred casing strands in the moisture absorbent material in the embodiment shown in FIG. 14, FIG. 15 is a sectional view showing still another embodiment of the moisture absorbent material disposed throughout the package, FIG. 15*a* is a detail sectional view showing the relationship of the casing strands to the moisture absorbent material in the embodiment shown in FIG. 15, FIG. 16 is a sectional view showing still another embodiment of the moisture absorbent material disposed in a variety of positions throughout the package, and FIG. 16*a* is a detail sectional view showing the relationship of the casing strands to the moisture absorbent material shown in FIG. 16.

SUMMARY OF THE INVENTION

This invention is based upon my discovery that shirred artificial sausage casings can be humidified to the critical predetermined moisture content required for satisfactory stuffing by packaging shirred casing strands of dry casing (preferably of a moisture content less than about 12%) in contact with moisture absorbent material. The strands are preferably placed in contact with a moisture absorbent pulp in the form of paper or paper-like sheets containing a predetermined amount of moisture sufficient to transfer to the casing to humidify the casing to the desired level. The shirred strands of casing and moisture absorbent pulp, containing added water, are packaged within a hermetically sealed or water-proof packaging material and stored for an extended period of time sufficient to allow the contents to approach equilibrium with respect to the distribution of the moisture present therein. The hermetically sealed or moisture proof packages are preferably stored at room temperature or higher, e.g. temperatures of 70° to 150° F. are satisfactory, for periods of time ranging from 3 to 28 days, sufficient to cause the contents of the carton to reach equilibrium. If desired, the storage period may be less, e.g. one to 3 days, and the casings will pick up moisture uniformly to a lesser extent but sufficient in many cases to provide a satisfactory degree of moistening for efficient stuffing of the casing with sausage emulsion. The shirred casings packaged within the hermetically sealed or water-proof packaging material have been found to pick up moisture uniformly from the absorbent material throughout the entire length of the shirred casings and with little variation in moisture content between the major and minor pleats of the shirred strands or between the inner and outer portions of those strands. In extensive tests, the casings have been found to be equal to or superior to casings humidified using moist air and are more uniform as to water content for longer length casings which are difficult to humidify by moist air circulation.

Referring to FIG. 1 of the drawings, there is shown a shirred strand 1 of an artificial sausage casing. In FIG. 2, the strand is shown in section in a manner which illustrates the major pleats 2 and minor pleats 3 of the shirred casing. The artificial sausage casing, whether of regenerated cellulose or other artificial casing materials, such as, starch, amylose, alginates, polyvinyl alcohol, vegetable protein, collagen, etc., is preferably shirred using a machine of the type described in the Korsgaard, Blizzard et al., or Matecki patents. In shirring artificial sausage casings, the casing is fed as flattened stock from a reel onto the shirring machine and is shirred from lengths of the order of 40 to 160 ft. or more down to shirred and compressed lengths of about 8 to 27 in.

In the past, it has been necessary to humidify the shirred casing strands to a predetermined moisture content, e.g. 15 to 20% (preferably about 16 to 18%), by packaging a number of shirred strands in a carton and circulating moist air therethrough until the casing reached the desired moisture level. The several strands of casing 1 were packed in layers in a carton 4 having ends walls 5 and 6 with a plurality of perforations 7 therein. The carton 4 was provided with perforations 7 in opposite ends thereof so that moist air could be blown through the carton when packed with a number of strands of shirred casing. In FIG. 3, the carton is shown in a closed position while FIG. 4 shows the carton opened. In the past, when shirred casings have been packaged and humidified in this manner, there have been serious disadvantages arising both from the humidification process and from the structure of the packing carton. The cartons 4 have presented special problems in manufacture, due to the perforations 7 in the end walls, and have been especially susceptible to damage due to the weakness of the end walls resulting from the perforations therein. Because the shirred strands of casing have been placed in the box or carton dry and subsequently humidified, additional problems have arisen from the expansion of the shirred strands during humidification. In some cases, the strands expand to such a degree as to bulge out or even burst the end of the packing carton. In other cases, the strands have had the pleats interlocked so that the expansion of one strand might have a tearing effect on an adjacent strand. A further objection to this packaging and humidification technique has been that the expansion of the shirred casing during humidification has resulted in the strands being wedged tightly in the packing carton with the result that it is difficult to remove the strands without damage from the carton.

In carrying out the present invention, the disadvantages of the prior art packing cartons and humidification process have been overcome. I have found that shirred strands of artificial sausage casings can be packed in a carton having imperforate walls with the individual strands in contact with a moisture absorbent material disposed throughout the carton and containing sufficient moisture initially to transfer to the shirred strands of casing to humidify the casings to a predetermined moisture content during extended storage. In practice, the shirred strands of casing are placed in a carton 10 having imperforate sides and end walls 11 and 12 and enclosed in a moistureproof covering 13, e.g. a plastic film such as polyethylene, polyvinyl, Mylar, saran, etc. The closed carton containing the shirred casing strands and moisture absorbent material, enclosed in the moistureproof covering, is shown in FIG. 5 of the drawings. In FIG. 6, there is shown a sectional view taken on the line 6—6 of FIG. 5. In FIG. 6, the carton 10 is shown enclosed in the waterproof covering or films 13. Shirred strands 14 of artificial sausage casings are shown disposed in layers within the carton 10 with dividers 15 of a moisture absorbent pulp therein. In FIG. 11, which is a detail sectional view taken on the line 11—11 of FIG. 6, the relationship of the shirred casing strands and moisture absorbent pulp dividers is shown in more detail.

In packaging and humidifying shirred strands of casing in accordance with this invention, a sheet of moisture absorbent pulp, preferably paper of the texture of a blotter paper, is placed in the carton and a predetermined amount of water measured onto the pulp sheet. Several strands of shirred casing 14 are then placed in a layer on the moistened sheet of pulp and another sheet of pulp placed on top of the layer. That sheet of pulp is in turn moistened by addition of a predetermined amount of water and another layer of shirred casing strands packed in place. The addition of alternate layers of shirred casing strands and sheets of moistened pulp is continued until the carton is filled. The carton is then closed and packed either alone or together with one or more additional cartons in a moistureproof covering, preferably a plastic film such as polyethylene.

In FIGS. 7 to 10 there are described several alternate packaging concepts utilizing the basic principals of this invention. In FIG. 7, the invention is shown applied to the packaging of shirred casing in a hermetically sealed or water-proof carton 20 which requires no outside plastic film 13 for protection as in the embodiment shown in FIG. 5. The carton 20 is shown in cross section in FIG. 8 and includes shirred strands of casing 14 interspersed with moistened pulp dividers 15 as shown in FIG. 6. In this form of the invention the carton 20 is preferably of molded plastic, is water-proof, hermetically sealed, and requires no external water-proof covering. Alternatively, the carton 20 may be of a water-proof cardboard provided with a very tight water-proof closure.

In FIG. 9, the invention is illustrated as applied to a package arrangement in which the water-proof or hermetically sealed covering is positioned inside the box or carton rather than outside. In FIG. 9, the water-proof plastic film 13 is positioned inside carton 10 rather than on the outside of the carton as shown in FIGS. 5 and 6. In this embodiment of the invention the strands of casing 14 are interspersed with moistened pulp sheets 15 as described in connection with FIG. 6.

In FIG. 10, the invention is illustrated as applied to the packaging of shirred strands of casing in a bag or flexible package without rigid sides. In FIG. 10, the strands of casing 14 are packaged in layers with sheets of moistened pulp 15 interspersed between successive layers of casing. The casing and sheets of moistened pulp are tightly encased or surrounded by a flexible plastic film 13 which is sealed at the top as illustrated by a lapped joint 19. The plastic film surrounding the several layers of casing and moistening sheets in FIG. 10 may be considered to be a bag or simply a plastic film enclosure holding the casing and moistening sheets tightly in place.

In FIGS. 12 to 16 of the drawings, there are shown a number of modifications of the basic inventive concept which utilize different configurations of the moisture absorbent pulp layers which are used for transfer of moisture to the packaged shirred strands of casing.

In FIG. 12, a long continuous sheet of moisture absorbent pulp material is used for transfer of moisture to the strands of casing. In that form of the invention, the moisture absorbent pulp is disposed in a tortuous path back and forth through the carton with the shirred casings being placed in layers as in FIGS. 6 and 11. The moisture absorbent pulp sheet 15 is provided with a measured amount of water for each layer of shirred casing strands.

FIG. 13 shows an alternate form of the invention in which the sheets of moisture absorbent pulp are of a zig-zag corrugated shape so that the shirred casing strands are contacted by the moistened pulp at additional points of contact to provide for better transfer of moisture. The relationship of the shirred casing strands to the corrugated moistened sheets of absorbent pulp is shown in more detail in FIG. 13*a* of the drawings.

FIG. 14 of the drawings shows still another modification in which the moisture absorbent pulp is formed in corrugations which have approximately the same radius of curvature as the shirred casings so that the casings are contacted with the moistened pulp over a greater surface. This relationship is shown in more detail in FIG. 14*a* of the drawings.

FIG. 15 shows still another embodiment of the invention in which the moisture absorbent strips are placed in the carton in different planes to provide a division similar to that in an egg carton or a carton of the type used for packaging light bulbs or Christmas tree ornaments. This arrangement separates the shirred casing strands entirely from one another and provides additional points of contact with the moistened pulp to facilitate transfer of moisture to the casings. This arrangement is shown in more detail in FIG. 15*a* of the drawings.

FIG. 16 of the drawings shows still another arrangement of moisture absorbent strips extending in different planes to separate the strands and provide a number of points of contact for transfer of moisture. This arrangement is shown in still more detail in FIG. 16*a*.

In the various modifications of the invention shown in FIGS. 5 to 16*a* of the drawings, the shirred casing strands in a dry condition (moisture content less than about 10%) are packaged in contact with the moisture absorbent pulp, or other moisture absorbent material, with a predetermined amount of moisture added to the pulp to transfer to the shirred casings a predetermined amount of moisture required to permit easy stuffing of the casings at a meat packing plant. The moisture is preferably metered onto the pulp during packaging of the cartons, and the cartons are either singly or in groups enclosed in a moisture-proof covering and stored at temperatures ranging from room temperature up to about 150° F. for periods of time ranging from 3 to 28 days. The cartons are preferably held at a predetermined temperature for a time sufficient to allow the contents to come to equilibrium. At equilibrium, the moisture absorbent pulp and the shirred casings have the predetermined amount of moisture, e.g. 15 to 20%, required for easy stuffing of the casings at a meat packing plant. The time and temperature required for the contents of the cartons to reach equilibrium are interdependent and inversely variable. Thus, at high temperatures, the casings will reach the desired moisture content in the shortest time, while at low temperatures, the time required is the greatest. In most cases, the cartons in which the shirred casings are stored are of a moisture-proof cardboard, such as a wax coated cardboard, to avoid loss of moisture from the sheets of moisture absorbent material and the casings to the cardboard in the packing cartons. In some cases, it is not necessary to store the cartons or packages of casing and moistened pulp sheets for a time sufficient to reach equilibrium distribution of moisture. Thus, if it is known that the casings are to be used within a relatively short period of time one may add a slight excess of moisture to the pulp sheets and the casings will take up the moisture at a uniform and predictable rate. At the end of about 2 or 3 days the casings will have absorbed sufficient moisture uniformly throughout their length to be usable for the preparation of sausages. If such packages were stored for an extended period of time the casing would reach a higher moisture content than is normally applied but would still be within the range of moisture content which is operative for stuffing. This modification of the process, i.e. storing the casing only long enough to allow the shirred casing to reach the desired moisture content and not equilibrium, makes it possible to ship the packaged casing at an earlier time.

In evaluating this invention, a large number of experiments were carried out in which different sizes and lengths of shirred regenerated cellulose casings were packaged and humidified to the predetermined critical moisture content required for satisfactory stuffing. The performance of these casings was compared with casings which had been humidified to substantially the same moisture content using the prior art technique of circulating moist air over shirred casing strands contained in a perforated carton.

In evaluating this humidification and packaging technique, it was necessary to determine its effectiveness on hundreds of strands of sausage casings to determine whether or not it would be satisfactory for commercial use. It is, therefore, impractical to set forth either by specific example or in a tabulated form the results obtained on the application of this humidification and packaging technique to any statistically significant number of shirred casing strands. The following examples are, therefore, illustrative of the results obtained with a large number of shirred sausage casings:

*Example 1*

A number of regenerated cellulose casings of the type used for production of frankfurters were shirred, humidified, and packaged in accordance with this invention. The casings had a diameter of 22.50 mm., a thickness of 0.9 to 1.1 mils, and were 55 ft. in length (shirred length 9 in.). These casings had an initial moisture content of 8 to 10%, which is the moisture level required for satisfactory shirring.

The casings were packed in an imperforate cardboard carton measuring 10½ in. x 8¾ in. x 4⅜ in. The humidification of the shirred casing strands was effected using sheets of absorbent pulp having the consistency of a heavy blotter paper and measuring 8½ in. x 10 in. (dry weight 44.6 g.). One of the sheets of absorbent pulp was placed in the bottom of the cardboard carton, and 53.5 g. water was added uniformly to the sheet. Ten strands of shirred cellulose casing were laid upon the moistened pulp and a sheet of pulp of the same size placed on top of the layer of shirred casing strands and the same amount of water added to the pulp. This procedure was repeated until the carton was full and a top layer of pulp added and moistened. The carton, when full, contained five layers of shirred casing strands (ten strands to the layer) and six sheets of moistened pulp. The carton was then closed and sealed in a moisture-proof covering of polyethylene film. The carton was stored for 21 days at 70° F. to allow the moisture content of the package and contents to reach equilibrium. The shirred casing strands which were packaged in this container had a moisture content of 17 to 18% which varied less than 1% between the major and minor pleats of the shirred strand and was substantially invariable along the length of the shirred strand. These shirred casings were stuffed at a meat packing house using a commercial sausage stuffer which filled the casings from shirred length to the fully extended 55 ft. length in 4 to 5 sec. Under these stuffing conditions, the breakage of the casings was about 3%. This breakage is equal to or lower than breakage of casings of the same size and shirred conditions which have been humidified to the same moisture content using the moist air humidification of the prior art. When shirred casing is packaged in accordance with any of the embodiments shown in FIGS. 5 to 16*a* using moistened pulp sheets as above described substantially identical results are obtained.

*Example 2*

Another series of experiments were carried out in which frankfurter casings 21.50 mm. diameter, 0.9 to 1.1 mils thickness, and 84 ft. length (15 in. shirred length) were humidified and packaged in accordance with this invention. The shirred casings were packaged in a carton measuring 16 in. x 8¾ in. x 4⅜ in. The carton was of a waxed cardboard so that there would be no moisture lost from the casing to the carton. The shirred casings were packaged in the carton in five layers of ten strands with six sheets of moistened absorbent pulp as described in the previous example, separating and contacting the strands of casing for transfer of moisture thereto. The sheets of pulp were 8⅞ in. x 15⅞ in. x 0.035 in. (68 g. dry wt.). Each of the sheets of absorbent pulp was moistened with 78 g. water. The filled carton was closed and packaged in a moisture-proof covering of polyethylene film and stored at 75° F. for 14 days. The casings which were treated in this manner had a uniform moisture content of 16% with substantially no variation between the major and minor pleats of the shirred strands or linearly thereof. In a test at a commercial meat packing house using a sausage stuffer having a stuffing speed of 8.1 ft./sec., 200 strands of casing were stuffed with no breakage. At the same time, 200 strands of casing were stuffed which had been humidified to 16% moisture content using the prior art moist air humidification technique. Under these stuffing conditions, one of the strands broke which had been treated in accordance with the prior art humidification technique.

Experiments have been carried out in which several thousand strands of shirred cellulosic casings have been packaged and humidified as described above. In these many experiments, casings were packaged and humidified which varied considerably in size and length and in the conditions of humidification. In each case, the shirred casings were packaged in contact with sheets of absorbent pulp having moisture added to produce a 15 to 20% (preferably 17 to 20%) moisture content in the casing after storage for a sufficient time to allow the moisture to reach equilibrium. The casings were packaged and stored in this manner for periods of time ranging from 5 to 28 days and temperature ranging from 70° to 100° F. (temperatures up to 150° F. or higher can be used if desired). As a result of these experiments, it was found that the rate of moisture transfer to the shirred casing strands is a function of time and temperature. At higher temperatures, the shirred casings will reach the critical predetermined moisture content required for stuffing in 5 days. At room temperature, the casings must be stored for 14 to 28 days for the moisture to reach equilibrium. As previously described, the pulp sheets may be moistened to a higher moisture content than is desired in the casing at equilibrium. In such cases, the casing will take up sufficient moisture after 2 or 3 days to have a satisfactory moisture content for stuffing. The casings which have been packaged and humidified in these experimental runs have been tested for moisture distribution and have been stuffed at commercial packing houses to determine whether the casings humidified in this manner are commercially usable. In every case, a comparison was made between casings which were humidified using the procedure of this invention and casings which were humidified following prior art humidification processes.

One of the principal advantages which has resulted from this packaging arrangement is a more uniform humidification of shirred casings along their entire length and along the major and minor pleat structure. Casings which have been humidified to a moisture content of 17 to 18% using the prior art moist air humidification technique often vary as much as 3 to 5% in moisture content between the major and minor pleats and vary considerably in moisture content along the length of the shirred casing strand. For example, a 160 ft. shirred casing (29 in. shirred length) was humidified to an average moisture content of 18% using the prior art moist air humdification technique. The moisture content of the casing was found to vary from 20 to 21% at the extreme ends to 12% at the center of the strand. The moisture will distribute evenly within the casing strand upon extended storage, but substantial differences in moisture content between the ends and middle of the strand have been found after storage periods of 60 to 90 days. A 160 ft. shirred strand (29 in. shirred length) was humidified to a 17 to 18% moisture content using the procedure of this invention, and the moisture content was found to vary less than 1% along the length of the casing and between the major or minor pleats or the outside or inside of the shirred strand.

While this invention is particularly applicable to the packaging and humidifying of sausage casings of cellulose of the type used for the preparation of frankfurters, the process is obviously applicable to the packaging and humidification of a wide range of casings. The process is primarily useful for thin walled regenerated sausage casings but can be used for sausage casings of thicker wall construction of the type used for processing large sausages, e.g. bolognas, etc., and may be used for fibrous casings or casings of a non-cellulosic type, e.g. alginate or collagen casings, etc. While the invention has been described with special emphasis upon certain preferred embodiments and certain preferred processing conditions, it will be obvious that variations in package configuration and process conditions can be made without departing from the inventive concept. It will, therefore, be obvious to any person skilled in the art that, within the scope of the appended claims, this invention can be practiced otherwise than as specifically described herein.

What is claimed is:

1. A plurality of shirred artificial sausage casings disposed in layers, said casings having a predetermined initial moisture content, moisture absorbent material disposed in contact with substantially all of said casings and containing sufficient moisture initially to humidify said casings to a predetermined higher moisture content, and a moisture-proof container enclosing said layers of shirred casings and moisture absorbent material.

2. A package in accordance with claim 1 in which the casings have an initial moisture content less than about 12% and said moisture absorbent material contains sufficient moisture initially to humidify said casings to a moisture content of about 15–20%.

3. The package in accordance with claim 1 in which said water proof container enclosing said shirred artificial sausage casings is (1) a carton closed on all sides with a moisture proof covering enclosing the carton, (2) a carton closed on all sides with a moisture proof covering positioned within the carton and enclosing the contents thereof, (3) a moisture proof carton, or (4) a flexible moisture proof cover enclosing said casings and moisture absorbent material.

4. A package in accordance with claim 1 in which the casings are stacked in layers and said absorbent material comprises sheets of moisture absorbent pulp positioned between said layers.

5. A package in accordance with claim 4 in which said sheets of moisture absorbent pulp are substantially flat.

6. A package in accordance with claim 4 in which said sheets of moisture absorbent pulp are corrugated.

7. A package in accordance with claim 4 in which said sheets of moisture absorbent pulp are disposed in a plurality of intersecting planes dividing said casings both horizontally and vertically.

8. A package in accordance with claim 4 in which said sheet of moisture absorbent pulp is a substantially continuous sheet interwoven between the respective layers of casing.

9. A method of humidifying shirred artificial sausage casings which comprises packing said casings at a predetermined lower moisture content in contact with a moisture absorbent material, adding a predetermined amount of water to said absorbent material sufficient to humidify said casings to a predetermined higher moisture content, enclosing said casings and moisture absorbent material in a moisture-proof container, and storing said container and the contents thereof for a time and at a temperature, not less than room temperature, sufficient to cause said casings to be humidified to a predetermined higher moisture content.

10. A method in accordance with claim 9 in which said casings have an initial moisture content less than about 12% and said casings are stored for a period of not less than several days and at a temperature not less than room temperature sufficient to cause said casings to be humidified to a moisture content of about 15–20%.

11. A method in accordance with claim 9 in which the moisture proof container in which the casings are enclosed is (1) a carton enclosed on all sides with a moisture proof covering enclosing the carton and its contents, (2) a carton enclosed on all sides and having a moisture proof covering positioned therein enclosing the contents of the carton, (3) a moisture proof carton, or (4) a flexible moisture proof cover enclosing said casings and moisture absorbent material.

12. A method in accordance with claim 9 in which the casings are stacked in layers and said moisture absorbent material comprises sheets of moisture absorbent pulp positioned between said layers.

13. A method in accordance with claim 12 in which said sheets of moisture absorbent pulp are substantially flat.

14. A method in accordance with claim 12 in which said sheets of moisture absorbent pulp are corrugated.

15. A method in accordance with claim 12 in which said sheets of moisture absorbent pulp are disposed in a plurality of intersecting planes dividing said casings both horizontally and vertically.

16. A method in accordance with claim 12 in which said package is stored for a period of time in the range from about 3 to 28 days at a temperature of 70° to 150° F., sufficient to cause the casings and said pulp to reach an equilibrium water content corresponding to the predetermined desired moisture content in the casings.

17. A method in accordance with claim 16 in which said casings are of regenerated cellulose and said predetermined final moisture content is about 15–20%.

References Cited by the Examiner

UNITED STATES PATENTS

| | | | |
|---|---|---|---|
| 2,181,329 | 11/1939 | Hewitt. | |
| 2,216,365 | 10/1940 | Fernandez | 99—193 |
| 2,336,291 | 12/1943 | Phillips | 99—193 |
| 2,470,465 | 5/1949 | Broeren et al. | 99—192 |
| 2,794,544 | 6/1957 | Firth | 99—176 X |
| 3,148,992 | 9/1964 | Hewitt | 99—175 X |

A. LOUIS MONACELL, *Primary Examiner.*

HYMAN LORD, *Examiner.*